United States Patent [19]

Ellis

[11] 4,213,417

[45] Jul. 22, 1980

[54] APPARATUS FOR APPLYING LIQUID COATING TO FOOD PRODUCTS

[75] Inventor: James R. Ellis, Cypress, Calif.

[73] Assignee: LeRoy Enterprises, Inc., Los Alamitos, Calif.

[21] Appl. No.: 943,675

[22] Filed: Sep. 19, 1978

[51] Int. Cl.² .............................................. B05C 3/10
[52] U.S. Cl. ...................................... 118/30; 118/428
[58] Field of Search ..................... 118/20, 30, 31, 423, 118/16, 428

[56] References Cited

U.S. PATENT DOCUMENTS

| | | | |
|---|---|---|---|
| 1,011,280 | 12/1911 | Trout et al. | 118/423 |
| 1,673,686 | 6/1928 | Kremmling | 118/30 X |
| 1,766,442 | 6/1930 | Lovell | 118/423 X |
| 1,957,961 | 5/1934 | Hunter | 118/30 X |
| 2,274,284 | 2/1942 | Vore | 118/423 X |
| 3,479,208 | 11/1969 | Dubble et al. | 118/324 X |

*Primary Examiner*—John P. McIntosh

*Attorney, Agent, or Firm*—Fulwider, Patton, Rieber, Lee & Utecht

[57] ABSTRACT

Apparatus for applying a liquid coating to food products, including a continuous dipper chain which submerges the food products in the coating liquid. A restraining mechanism in the form of a pressure plate or chain acts upon the tops of the products to maintain them in submerged position during travel through the liquid. In one embodiment the dipper chain is driven intermittently to allow excess liquid on the food products to drain off. A continuous drying chain is provided to carry coated food products along a drying run, a transfer system being employed for moving the food products from the dipper chain to the drying chain. The drying chain is flexible and supported at relatively great intervals to allow the chain to form into peaks and valleys. The food products tip forward and backward in negotiating these peaks and valleys, breaking away the bottoms of the food products and the drying chain and preventing adherence.

3 Claims, 8 Drawing Figures

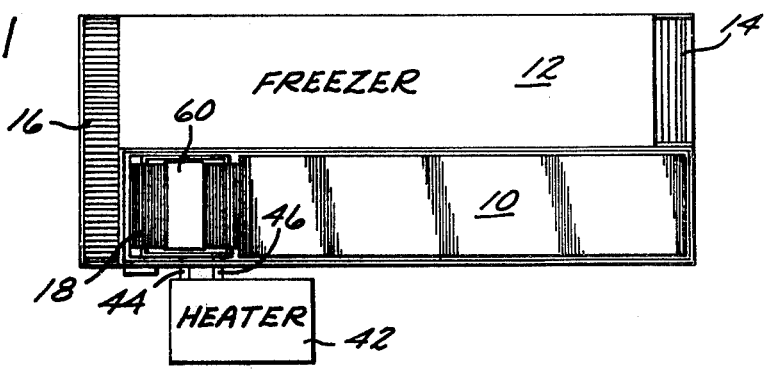
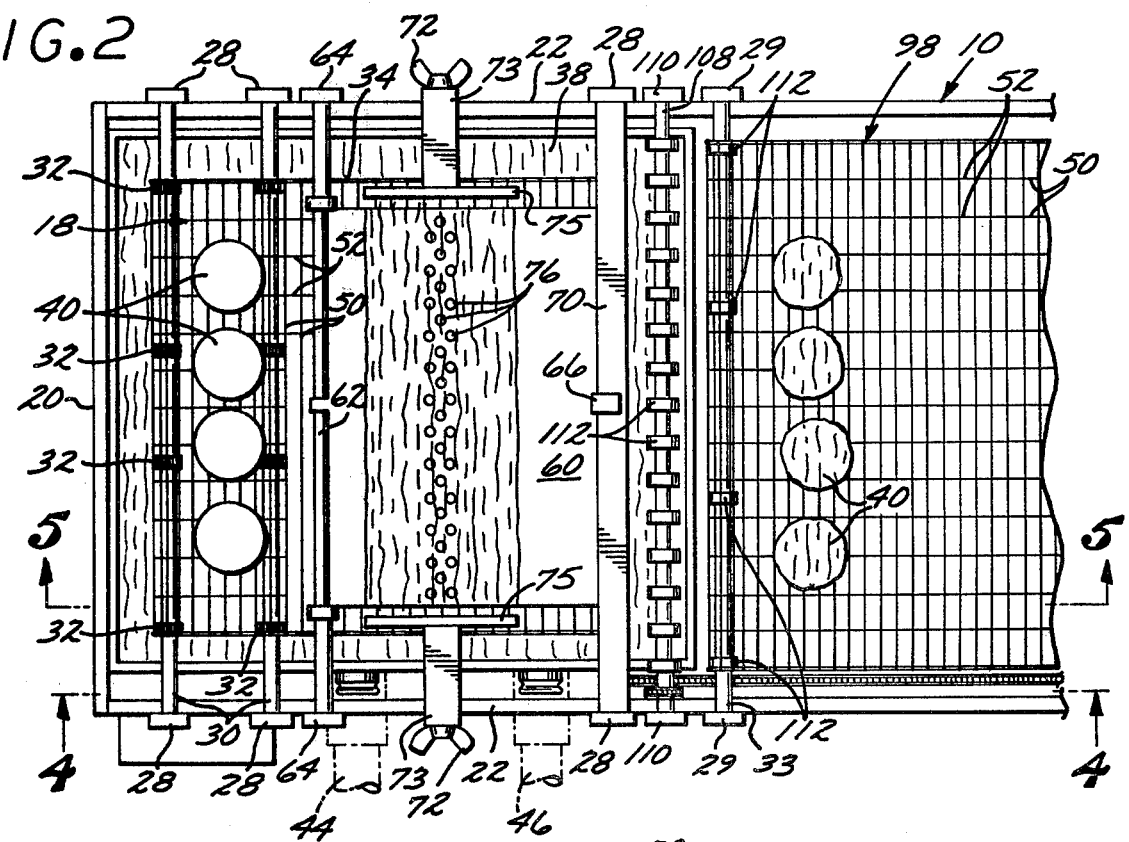
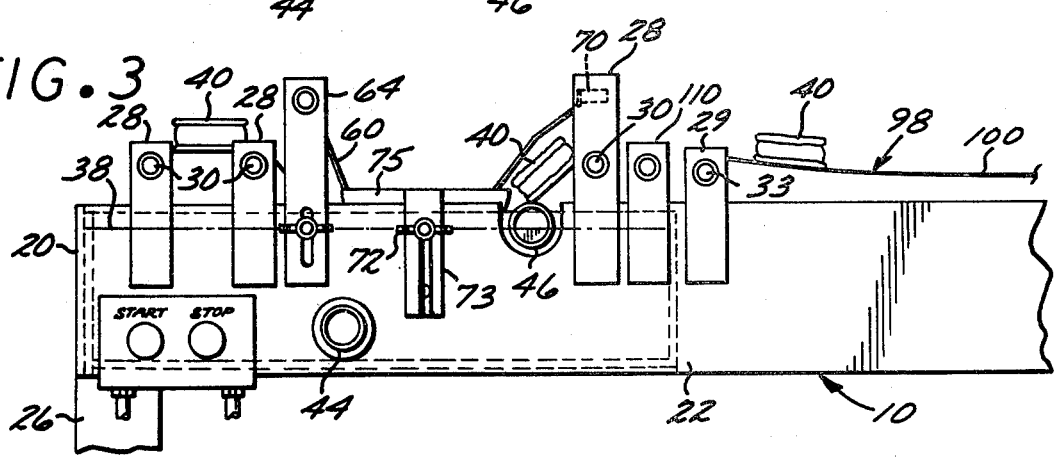

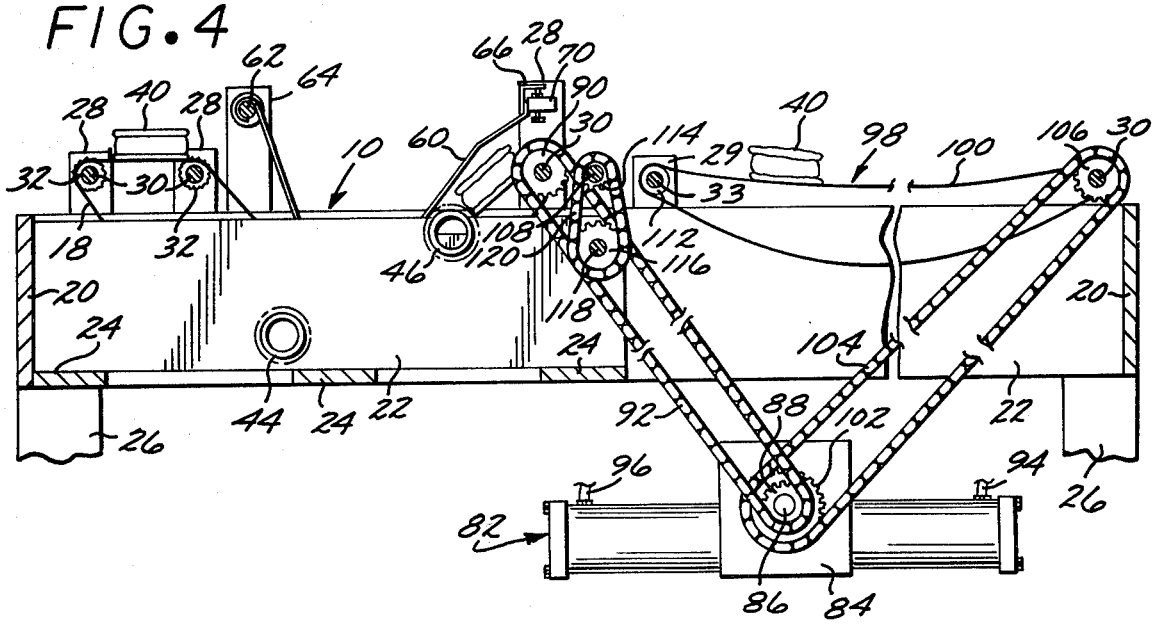
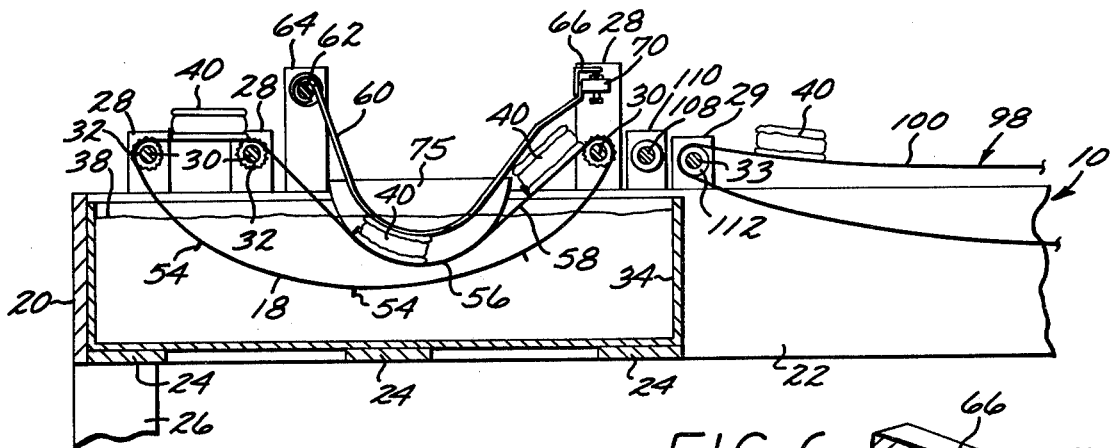
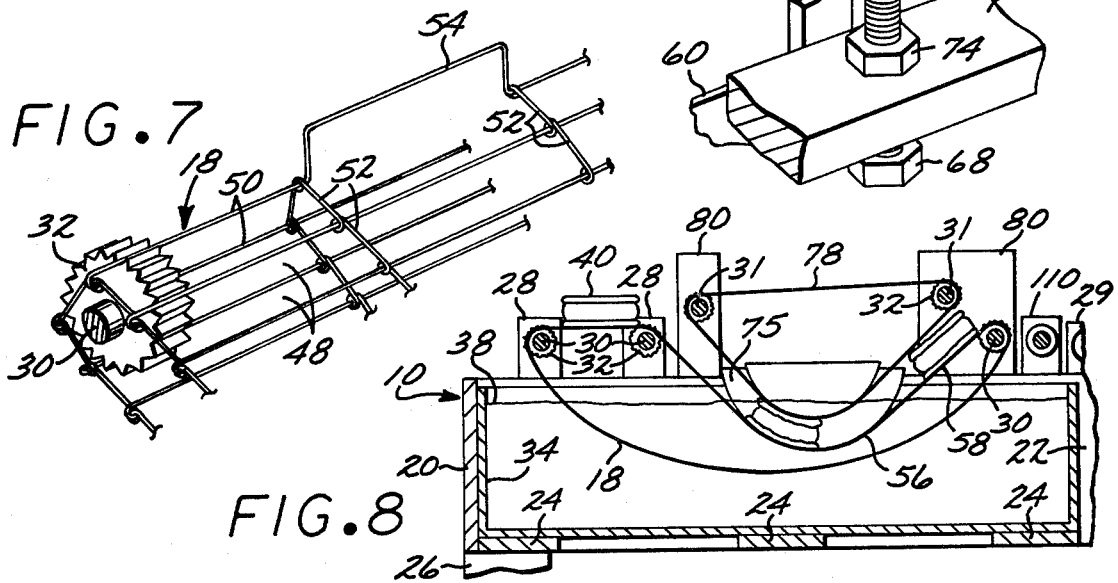

APPARATUS FOR APPLYING LIQUID COATING TO FOOD PRODUCTS

BACKGROUND OF THE INVENTION

1. Field of the Invention:

The present invention relates to apparatus for applying a liquid coating of food products by submergence in the liquid.

2. Description of the Prior Art

The present invention has broad application to the coating of a variety of food products with various liquid materials. However, it has particular utility in the coating of food products which are buoyant in the liquid used. For example, the ice cream sandwiched between a pair of cookies to form an ice cream sandwich is buoyant. When such a sandwich is submerged in a coating liquid such as chocolate syrup, the sandwich tends to float and frustrates efforts to coat the sandwiches by moving them through the liquid on a conveyor belt.

A typical prior art method for coating ice cream sandwiches with chocolate syrup involved manual placement of the sandwiches in an open mesh wire basket. The basket is pressed down into the chocolate syrup to overcome the buoyancy of the sandwiches. The coated sandwiches are then manually transferred onto trays. The excess chocolate syrup runs onto the trays and partially solidifies. This is wasteful of syrup and also makes it difficult to separate the sandwiches which are adhered to the trays. It is present practice to place the trays in a special freezer or hardening room to reduce the temperature of the trays enough for the chocolate coated sandwiches to be more easily broken free of the trays. The separated sandwiches can then be wrapped for storage or shipment.

The waste of materials, the high cost of the manual operations, and the capital investment required in expensive freezers undesirably raise the price of the final product sold to the public.

Another system of the prior art utilized conveyor belts which dipped down into the chocolate syrup only enough to coat the bottoms of the sandwiches. The top and sides were supposed to be coated by passage of the sandwiches through a falling curtain of chocolate syrup. However, this wasted syrup since it tended to pile on top of the upper cookie, and also the upper cookie acted somewhat like an umbrella and prevented the chocolate syrup from reaching the sides of the sandwiches. The sides could only be reached by side sprays, but this then limited the coating operation to a one-line assembly; that is, only one sandwich wide, and the production rate was very low.

SUMMARY OF THE INVENTION

According to the present invention apparatus is provided for applying a liquid coating to food products such as ice cream sandwiches by totally immersing or submerging them in the liquid material, and maintaining them in a submerged state in a manner and for a time sufficient for the liquid material to coat the complete exterior of the products.

The apparatus includes a relatively wide, continuous loop of dipper chain which travels in a generally longitudinal direction, dipping down into a container filled with the liquid coating material. The chain is characterized by a multiplicity of interstices so that the liquid can easily flow in and about the food products. The apparatus further includes restraining means located above the dipper chain and operative upon the tops of the submerged food products to prevent buoyant products from floating out of the liquid material. In one embodiment the restraining means comprises an apertured pressure plate. The food products slide across the underside of the plate, and liquid material flows through the plate apertures onto the tops of the food products. In another embodiment the restraining means takes the form of a continuous chain heavy enough to press down upon the food products as it moves with the products through the liquid coating material.

The apparatus preferably also includes a drive mechanism adapted to move the dipper chain intermittently so that the food products are momentarily stopped as they come out of the liquid. Excess liquid can then drip from the products back into the liquid container.

A continuous drying chain is preferably longitudinally aligned with the dipper chain. It is characterized by a multiplicity of interstices to minimize the area of contact with the food products and is operative to accept the products for travel along a drying run. The drying chain is flexible and supported at intervals sufficiently great that the chain sags into a succession of peaks and valleys. This causes the bottoms of the food products to tip or rock forward and backward as they move along the drying run, and thereby prevents undesirable sticking of the hardening coating material to the drying chain.

A transfer mechanism is provided between the dipping chain and the drying chain to facilitate transfer of the food products from one to the other, the transfer mechanism preferably being operative to engage and move the food products at a rate of travel greater than the rate of travel imparted to them by the dipper chain.

As a consequence of the foregoing, the coating operation is substantially completely automated, thereby reducing labor costs to a minimum and eliminating any need for rehardening or refreezing of the food products prior to wrapping for storage or shipment.

Other objects and features of the invention will become apparent from consideration of the following description taken in connection with the accompanying drawings.

BRIEF DESCRIPTION OF THE DRAWINGS

FIG. 1 is a partially diagrammatic top plan view of the present apparatus for applying a liquid coating to food products, including a showing of the associated freezer and heater units;

FIG. 2 is a partial top plan view of the left or feed extremity of the coating apparatus;

FIG. 3 is a right side elevational view of the portion of the apparatus illustrated in FIG. 2;

FIG. 4 is a view taken along the line 4—4 of FIG. 2, together with a partial showing of the right or discharge extremity of the apparatus;

FIG. 5 is a view taken along the line 5—5 of FIG. 2;

FIG. 6 is an enlarged detail view of the height adjustment assembly for the pressure plate;

FIG. 7 is an enlarged partial detail view of a portion of the dipper chain engaged upon one of the drive sprockets; and FIG. 8 is a view similar to FIG. 5, but illustrating another form of restraining means for maintaining the food products submerged during the coating operation.

DESCRIPTION OF THE PREFERRED EMBODIMENTS

Referring now to the drawings, and particularly to FIG. 1, an apparatus 10 is illustrated for applying a liquid coating to food products such as application of chocolate ice cream sandwiches. It will be understood, however, that the coating of ice cream sandwiches is merely exemplary and that various other food products can be coated with the present apparatus.

A conventional freezing tunnel or freezer 12 located adjacent the apparatus 10 accepts uncoated ice cream sandwiches placed upon a conveyor 14. The conveyor 14 carries the sandwiches through the freezer 12 in a generally longitudinal direction and deposits them on a transversely moving conveyor 16. The freezer 12 lowers the temperature of the sandwiches enough to enable the sandwiches to be coated without melting. It forms no part of the present invention.

The conveyor 16 moves the sandwiches to an operator station adjacent the feed end of the apparatus 10. An operator takes the sandwiches off the conveyor 16 and places them upon a continuous dipper chain 18 to initiate the coating operation. If desired, the operation can be more completely automated to eliminate manual transfer of the sandwiches from the conveyor 16, as will be apparent to those skilled in the art.

As best seen in FIGS. 2 through 4, the dipper chain 18 is carried by a longitudinally extending frame having a pair of ends 20, a pair of sides 22, three transversely disposed cross members 24 secured to the sides 22, and supporting legs 26.

A plurality of transversely aligned, longitudinally spaced apart pairs of upright shaft supports 28 and 29 are secured at their lower extremities to the opposite sides 22 of the frame. Each pair of supports 28 rotatably supports the ends of a transverse sprocket shaft 30, and each shaft 30 mounts a plurality of uniformly transversely spaced apart toothed conveyor elements or sprockets 32. Each pair of supports 29 rotatably supports the ends of a transverse roller shaft 33, and the shaft 33 mounts a plurality of uniformly transversely spaced apart collars or rollers 112.

An upwardly open, transversely extending rectangular container 34 is secured to the feed end 20 of the apparatus frame, and rests upon and is also secured to the transverse cross braces 24. The container 34 is adapted to hold coating material such as chocolate syrup 38, as best seen in FIG. 5. The syrup 38 is preferably maintained at a uniform temperature of approximately 110 degrees Fahrenheit to facilitate coating of the ice cream sandwiches, generally indicated at 40 in FIG. 2. At room temperature the frozen sandwiches cause the syrup to solidify into a semi-hard chocolate layer.

The heater is diagrammatically indicated at 42 in FIG. 1. It forms no part of the present invention and may be any commercially available heater suitable to accept a supply of syrup, heat it and pump it into the container 34 for use. In the illustrated arrangement a supply of syrup is poured into the heater reservoir (not shown), from which it is pumped through an inlet conduit 44 to the container 34. When the liquid reaches the desired level, as seen in FIG. 5, the excess overflows through an outlet conduit 46 and passes back to the heater for reheating and continuous circulation.

The dipper chain 18 is a continuous, longitudinally disposed loop, and extends across substantially the entire width of the container 34. It travels in a generally longitudinal direction and is characterized by a multiplicity of interstices 48 which are defined by a grid of intersecting wires 50 and 52. The wires 50 extend across the width of the chain, while the wires 52 are a plurality of short sections which are looped at opposite ends about adjacent wires 50. With this arrangement the wires 50 and 52 are movable relative to one another to render the chain 18 sufficiently flexible to pass around the various sprockets 32, as best seen in FIGS. 2 and 7.

The wires 50 are successively received between the cogs or teeth of the sprockets 32. Clockwise rotation of the sprockets 32 is operative to advance the chain 18 in a generally clockwise direction, as seen in FIG. 5, to advance the sandwiches 40 through the submerged run 56 and toward the discharge end of the apparatus 10. Certain ones of the wires 50 are bent upwardly generally normal to the plane of the adjacent wires 50 and 52 to form four, transversely spaced apart portions or carrier dogs 54, as seen in FIG. 2, to engage and move four sandwiches 40. Of course, the number of dogs 54 can vary, depending upon the width of the apparatus desired.

Each wire 50 provided with the dogs 54 is longitudinally spaced from the next wire 50 provided with the dogs 54 a distance slightly greater than the diameter of one of the sandwiches 40 to provide adequate space for the sandwiches to occupy.

Chain suitable for the dipper chain 18 is available commercially as stainless steel wire belt. It is commonly used to convey food products in food processing operations.

As best seen in FIG. 5, dipper chain 18 slopes or dips down into the container 34 to define a submerged run 56. Thereafter, it rises out of the container at approximately a 45° angle to define a drip run 58.

Ice cream is naturally buoyant in the chocolate syrup 38 and a restraining means in the form of an arcuate, transversely extending squeegee and pressure plate 60 is provided to prevent floating of the sandwiches 40 during their passage through the submerged run 56. The curved underside of the plate 60 is spaced just above the submerged run 56 of the chain 18, the spacing approximating the thickness of a sandwich 40 so that the plate slidably engages the tops of the sandwiches 40 and holds them down as they travel toward the drip run 58.

The upper left or feed edge of the plate 60, as seen in FIGS. 2 and 5, includes one or more curved or reversely form sections which rotatably fit about a transverse shaft 62 supported at its opposite ends by a pair of upright plates 64. Plates 64 are attached at their lower ends to the opposite frame sides 22 by usual wing nuts threaded onto bolts (not shown) carried by the frame sides and passing through vertical slots in the plates 64. As will be apparent, loosening of the wing nuts allows the height of the plates 64 and shaft 62 to be adjusted.

The opposite or discharge edge of the plate 60 includes a centrally located, right angular section having a horizontal tab 66 which rests upon the upper end of a vertically disposed, threaded bolt 68, as best seen in FIGS. 5 and 6. The bolt 68 is threaded through a transverse element 70 which is secured at its opposite ends to the pair of downstream shaft supports 28. Rotation of the bolt 68 in opposite directions raises and lowers the tab 66. This, together with adjustment of the height of the shaft 62, enables adjustment of the vertical position of the pressure plate 60 for accommodating food products of different thicknesses. A lock nut 74 threaded onto the bolt 68 is tightened against the element 70 to maintain its adjusted position. The weight of the plate 60 is sufficient to cause it to bear down against the tops of the sandwiches 50 and keep them submerged in the syrup 38. However, the plate 60 is free to rise at its discharge end and prevent jamming if, for example, an oversize sandwich entered the submerged run 56.

A pair of guides or plate segments 75 are located at opposite sides of the plate 60. The segments include arcuate lower edges and are made of low friction bearing material such as an acetyl resin of the type which is a crystalline form of polymerized formaldehyde, one form being known in the trade by the trademark DELRIN, owned by E. I. Du Pont de Nemours & Co. The segments 75 are secured to the horizontal legs of a pair of angle brackets 73 whose upright legs are vertically slidably engaged upon the frame sides 22, respectively. The upright legs of the brackets 73 are adjustably held in a selected vertical position by a pair of wing nuts 72 threaded onto bolts (not shown) extending into the frame sides 22 through vertical slots in the brackets 73. The slots extend to the bottom of the brackets 73 to enable removal and cleaning of the segments 75 and brackets 73.

The arcuate undersides of the segments 75 bear against the dipper chain 18 and cause it to assume a shape complemental to that of the pressure plate 60 for properly supporting the sandwiches 40 in the submerged run 56.

The arcuate central portion of the plate 60 is provided with a plurality of staggered apertures 76 to allow syrup 38 to flow down onto the top of the sandwiches 40. Without the apertures 76, the underside of the plate 60 has a wiping or squeegee effect which tends to control the quantity of syrup 38 which builds upon the sandwich tops, depending upon the upwardly or downwardly adjusted position of the plate 60 and the size of the sandwich.

An alternative embodiment is illustrated in FIG. 8 for maintaining the sandwiches 40 in submerged relation during their passage through the submerged run 56. Instead of using a pressure plate 60, the restraining means takes the form of a continuous loop of upper chain 78 substantially identical in construction to the chain 18, but without the carrier dogs 54. The upper chain 78 is made of material sufficiently heavy that the weight of the lower run of the chain 78 is sufficient to overcome the natural buoyancy of the sandwiches 40.

The chain 78 is disposed about a pair of transverse sprocket shafts 31 rotatably supported at their opposite ends by two pairs of transversely aligned longitudinally spaced apart upright supports 80 secured to the opposite frame sides 22. Each of the shafts 31 is characterized by a plurality of the sprockets 32 for engagement and movement of the chain 78 upon rotation of the shafts 31. The upper chain 78 moves at generally the same rate as the dipper chain 18 and the multiplicity of apertures in the chain 78 allows syrup 38 to coat the sandwich tops. The chain 78 is positively driven by a conventional take-off from the drive system for the chain 18 (not shown), as will be apparent.

As best seen in FIG. 4, a drive means 82 is provided for driving the chain 18. Although the drive means can be one which drives the chain at a constant rate, it preferably takes the form of a conventional stepper mechanism 84. An output shaft 86 of the mechanism mounts a sprocket 88 for rotation in a clockwise direction. This operates a drive chain 92 which rotates a sprocket 90 mounted to the sprocket shaft 30 located nearest the discharge end of the machine.

The stepper mechanism 84, as is well known, is operative to provide an intermittent movement of the dipper chain 18. This allows excess liquid coating on the sandwiches 40 to drain off while the sandwiches are halted in the drip run 58.

The stepper 84 is not a part of the present invention, being well known to those skilled in the art, and it will therefore be only generally described. It is a racheting mechanism which includes in internal piston (not shown) movable to the left, as viewed in FIG. 4, by application of pneumatic pressure through a conduit 94. Air on the opposite side of the piston is exhausted through a conduit 96. As the piston moves to the left, a rack associated with the piston rotates a pinion (not shown) connected to by a one-way clutch bearing to the shaft 86. This rotates the shaft 86 in a clockwise direction.

The piston is returned by pneumatic pressure applied to conduit 96, with the clutch slipping or overriding so that the shaft 86 is not rotated. During return movement of the piston the dipper chain 18 is a stationary and is only again moved in a clockwise path when the stepper mechanism 84 is again actuated by pneumatic pressure applied at the inlet conduit 94. The pneumatic system is also conventional and is therefore not described in detail.

The continuous drying chain 98 is substantially identical to the dipper chain 18, differing essentially in that it does not include the carrier dogs 54. Chain 98 is longitudinally aligned with chain 18 for receipt of coated sandwiches 40. Chain 98 includes an upper or drying run 100 which passes over the roller shaft 33 at the feed end of the chain 98, over a sprocket shaft 30 at the discharge end of the chain 98, and also over a plurality of longitudinally spaced apart intermediate roller shafts (not shown) located between the roller shaft 33 and sprocket shaft 30. The drying run 100 is considerably longer than is illustrated, the showing being shortened in the drawings to save space.

The chain 98 is engaged by sprockets 32 of the shaft 30 in the same manner as the chain 18 is engaged by the sprockets 32 of the chain 18.

The longitudinal intervals between the shaft 33, intermediate roller shafts (not shown), and shaft 30 are sufficiently great that the chain 98 sags or dips between the shafts to form a succession of catenaries or peaks and valleys. The peaks are defined by the sections of chain 98 riding over the shafts, and the valleys are defined by the lower lying sections of chain located intermediate the shafts. With this arrangement the bottoms of the sandwiches 40 do not travel in a purely horizontal plane, but instead alternately ride up upon the shafts tipping backwardly, and then ride downover the shafts, tipping forwardly. This alternate rocking back and forth breaks the sandwich bottoms away from the chain 98 and prevents adherence to the chain of the hardening chocolate coating.

The stepper mechanism 82 not only intermittently drives the chain 18, but also the drying chain 98. As best seen in FIG. 4, a drive sprocket 102 mounted to the output shaft 86 drives a chain 104. This rotates a sprocket 106 carried by the sprocket shaft 30. The diameters of the sprockets are preferably selected such that the rate of movement of the drying chain 98 is one-third that of the dipper chain 18. However, the relative rates of travel are somewhat empirical and can be adjusted as required.

A transfer mechanism is provided for conveying the sandwiches 40 from the dipper chain 18 to the drying chain 98. As best seen in FIGS. 2 and 4, the mechanism comprises a transverse roller shaft 108 rotatably mounted at its opposite extremities to a pair of upright plates 110 which are secured at their lower extremities to the frame sides 22.

The discharge end of the dipper chain 18 and the feed end of the drying chain 98 are longitudinally spaced apart a short distance, and the roller shaft 108 is located in this space. The shaft 108 mounts a plurality of transversely spaced rollers 112. As will be seen, these rollers 112 are rotated clockwise by the shaft 108 at a rate such that they move the sandwiches 40 approximately twice as fast as the sandwiches are moved by the dipper chain 18. This tends to pull the sandwiches off the chain 18 before they have a chance to dip down prior to riding onto the chain 98. That is, the freshly coated sandwiches 40 ride off the discharge end of the dipper chain 18 just as the chain 18 passes about the end discharge sprocket, and the more rapidly rollers 112 engage and thrust the sandwiches 40 onto the adjacent feed end of the drying chain 98, pulling the sandwiches 40 away from the carrier dogs 54 of the dipper chain 18 before there is any opportunity for the sandwiches to flip over under the impetus of the moving chain 18.

The stepper 84 drives the roller shaft 108 through a sprocket 114 mounted to the shaft 108. More particularly, a sprocket 116 is carried by a jack shaft 118 which is rotatably mounted to the adjacent frame side 22 just below the sprocket 114. The sprockets 114 and 116 are coupled together by a drive chain 120. Another sprocket (not shown) is also mounted to the jack shaft 118 adjacent and inwardly of the sprocket 116. It is engaged by the drive chain 92 to effect rotation of the sprocket 114 by the drive chain 92.

The diameter of the sprockets 114 and 116 is selected such that the desired rate of movement of the sandwiches 40 by the rollers 112 is approximately twice that imparted by the dipping chain 18.

In operation, uncoated sandwiches 40 are manually placed upon the conveyor 14 for passage through the freezer 12. When the sandwiches leave the freezer 12 the ice cream is sufficiently hardened that the sandwiches can be coated with the chocolate syrup 38 without melting of the ice cream. Sandwiches leaving the freezer 16 are deposited upon the transverse conveyor 16, and an operator manually transfers four of the sandwiches from the conveyor 16 to positions ahead of four of the carrier dogs 54 on the dipper chain 18.

The chain 18 carries the sandwiches through the submerged run 56, the pressure plate 60 holding the sandwiches in a submerged state while the coating takes place. Apertures 76 in the plate 60 facilitate coating the tops of the sandwiches, as previously described.

The coated sandwiches are momentarily halted in the drip run 58 by virtue of the intermittent drive which characterizes the stepper 84, allowing excess syrup to drain back into the container 34.

Sandwiches leaving the dipper chain 18 are engaged by the more rapidly rotating rollers 112 of the transfer mechanism, and are thrust onto the feed end of the drying chain 98.

The drying chain 98 is supported such that it drapes itself into a series of peaks and valleys between its support points. This causes the sandwiches 40 to rock as they negotiate the peaks and valleys, thereby breaking them free of adherence with the drying chain 98. Such breaking loose is also facilitated by the trembling and shaking of the flexible chain as it moves through the drying run 100 to advance the sandwiches 40 toward the wrapping station (not shown) at the discharge end of the chain 98.

Various modifications and changes may be made with regard to the foregoing detailed description without departing from the spirit of the invention.

I claim:

1. Apparatus for applying a liquid coating to food products, said apparatus comprising:
    a transversely extending container for liquid material;
    a continuous dipper chain extending across the width of said container, operative to travel in a generally longitudinal direction, and characterized by a multiplicity of interstices, said dipper chain dipping down into said container to define a submerged run and rising out of said container to define a drip run, said chain further including carrier means for engaging and carrying products placed upon said dipper chain through said submerged run and said drip run;
    restraining means including a continuous sheet of material extending across the width of said container, fixed in position during normal operation and located above said submerged run of said dipper chain, said sheet of material constituting a squeegee and pressure plate operative upon the tops of products placed upon said dipper chain and moving through said submerged run to control the thickness of said liquid material upon said products and to prevent rising of products buoyant in said liquid material; and
    drive means for operating said dipper chain.

2. Apparatus according to claim 1 wherein said pressure plate includes a plurality of apertures opening to said underside for the passage of liquid.

3. Apparatus according to claim 1 and including a pair of normally stationary guides fixed adjacent opposite ends of said container, respectively, and including arcuate undersides within said container, the side portions of said dipper chain being in engagement with said undersides, respectively, to guide said dipper chain through said submerged run at a predetermined distance from said squeegee and pressure plate.

* * * * *